US012753087B2

(12) United States Patent
Liao

(10) Patent No.: US 12,753,087 B2
(45) Date of Patent: Oct. 6, 2026

(54) NANOPARTICLES, DISPERSION OF NANOPARTICLES, AND PRODUCTION METHOD OF NANOPARTICLES

(71) Applicant: TOKYO OHKA KOGYO CO., LTD., Kanagawa (JP)

(72) Inventor: YuehChun Liao, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 711 days.

(21) Appl. No.: 18/160,416

(22) Filed: Jan. 27, 2023

(65) Prior Publication Data

US 2023/0303404 A1 Sep. 28, 2023

(30) Foreign Application Priority Data

Jan. 31, 2022 (JP) ................................ 2022-013475
Dec. 23, 2022 (JP) ................................ 2022-207169

(51) Int. Cl.
*C01G 33/00* (2006.01)
*C01G 23/04* (2006.01)
*C07F 7/08* (2006.01)

(52) U.S. Cl.
CPC ............. *C01G 33/00* (2013.01); *C01G 23/04* (2013.01); *C07F 7/0834* (2013.01); *C01P 2002/70* (2013.01)

(58) Field of Classification Search
None
See application file for complete search history.

(56) References Cited

U.S. PATENT DOCUMENTS

2012/0088845 A1* 4/2012 Gonen Williams ...... H01B 1/14 427/427
2017/0226418 A1* 8/2017 Otsuka ................ H10H 20/854
2021/0091323 A1 3/2021 Yokoyama et al.

FOREIGN PATENT DOCUMENTS

JP 2009102550 A 5/2009
JP 2011031134 A * 2/2011
JP 2016108189 A 6/2016
JP 6698591 B2 5/2020
WO 2020105207 A1 5/2020

OTHER PUBLICATIONS

Machine Translation of JP-2011031134-A (Year: 2011).*

* cited by examiner

*Primary Examiner* — Michael Forrest
(74) *Attorney, Agent, or Firm* — Rankin, Hill & Clark LLP

(57) ABSTRACT

Nanoparticles including inorganic oxide particles and having good dispersibility, a dispersion of nanoparticles including said nanoparticles, and a production method of said nanoparticles are provided. Surfaces of inorganic oxide particles is functionalized with a functionalizing agent including niobium compound having a specific structure and a silane compound having a specific structure. The inorganic oxide particles are preferably titanium oxide particles or zirconium oxide particles. Average primary particle size of the nanoparticles measured by X-ray diffraction method is preferably 3 nm or more and 20 nm or less.

6 Claims, 1 Drawing Sheet

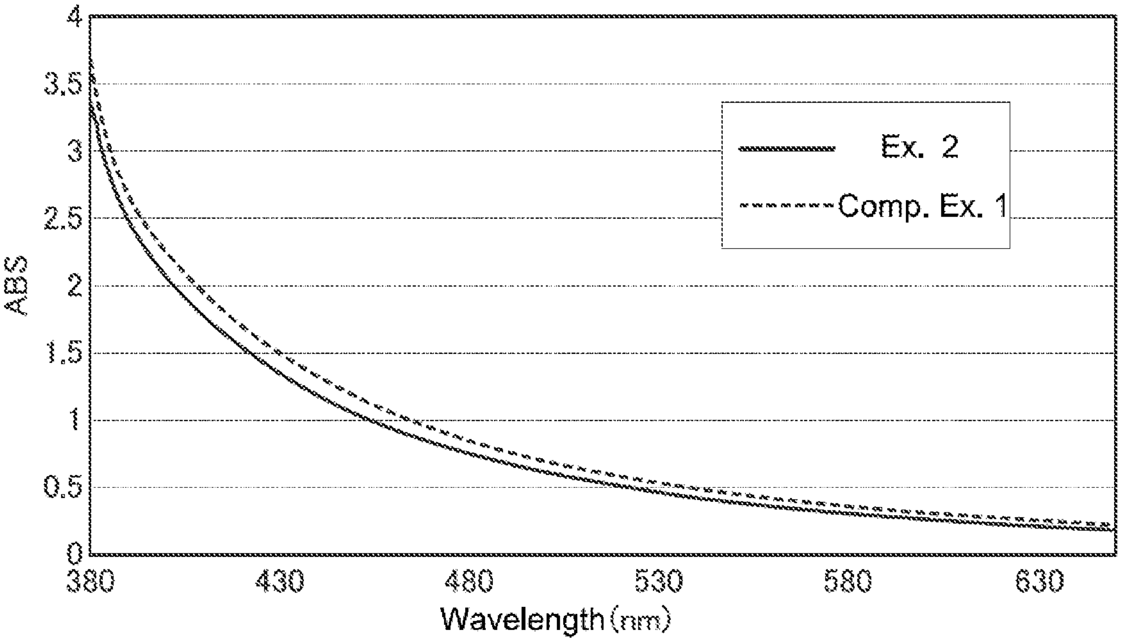
4
3.5
3
2.5
2
1.5
1
0.5
0
ABS
380
430
480
530
580
630
Wavelength (nm)
Ex. 2
Comp. Ex. 1

NANOPARTICLES, DISPERSION OF NANOPARTICLES, AND PRODUCTION METHOD OF NANOPARTICLES

BACKGROUND OF THE INVENTION

Field of the Invention

The present invention relates to nanoparticles including inorganic oxide particles where those surfaces are functionalized with a functionalizing agent including niobium compound having specific structure and a silane compound having specific structure, a dispersion of nanoparticles including said nanoparticles, and a production method of nanoparticles including reacting inorganic oxide particles with the aforementioned functionalizing agent.

Related Art

Nanoparticles including inorganic oxide particles have been conventionally used for various purposes. For example, in an optical component application, a high refractive index material is used. As a material for forming the high refractive index material, for example, a composition including an organic component and inorganic oxide particles such as zirconium oxide particles dispersed in the organic component is often used. As a method for improving dispersibility of the inorganic oxide particles in such compositions, a method of functionalizing surfaces of the inorganic oxide particles by binding a functionalizing agent to the surfaces of the inorganic oxide particles is known. Organosilanes such as n-propyltrimethoxysilane are known as a functionalizing agent (see Patent Document 1).

Patent Document 1: Japanese Patent No. 6698591

SUMMARY OF THE INVENTION

However, inorganic oxide particles very easily aggregate. Therefore, the effect of surface functionalization with organosilanes such as n-propyltrimethoxysilane to improve dispersibility is not necessarily sufficient. Such a circumstance is raising the need for nanoparticles including inorganic oxide particles and having good dispersibility in a dispersion.

In view of these existing circumstances, the present invention has been made and an object thereof is to provide nanoparticles including inorganic oxide particles and having good dispersibility, a dispersion of nanoparticles including said nanoparticles, and a production method of said nanoparticles.

The inventors have conducted intensive research to solve the above problems. As a result, the present inventors have found that the above-mentioned problems can be solved by functionalizing surfaces of inorganic oxide particles with a functionalizing agent including niobium compound having a specific structure and a silane compound having a specific structure, and accomplished the present invention. In more detail, the present invention provides the followings.

A first aspect of the present invention relates to nanoparticles including inorganic oxide particles where those surfaces are functionalized with a functionalizing agent including at least one selected from a niobium compound represented by formula (1) below:

$$(R^{10}O)_{5-n}Nb(R^{11})_n \quad (1)$$

in which, in the formula (1), n is an integer of 1 or more and 4 or less, $R^{10}$ is an alkyl group, and $R^{11}$ is a monovalent organic group bonding to niobium atom via Nb—C bond, and at least one selected from a silane compound represented by formula (2) below:

$$(R^{20}O)_{4-x}Si(R^{21}-R^{22})_x \quad (2)$$

in which, in the formula (2), x is an integer of 1 or more and 3 or less, $R^{21}$ is a spacer group bonding to a silicon atom via Si—C bond, and $R^{22}$ is a hydrogen atom or a monovalent organic group.

A first aspect of the present invention relates to a dispersion of nanoparticles including the nanoparticles according to the first aspect in a dispersion medium.

A third aspect of the present invention relates to a production method of nanoparticles including reacting surfaces of inorganic oxide particles with a functionalizing agent including at least one selected from a niobium compound represented by formula (1) below:

$$(R^{10}O)_{5-n}Nb(R^{11})_n \quad (1)$$

in which, in the formula (1), n is an integer of 1 or more and 4 or less, $R^{10}$ is an alkyl group, and $R^{11}$ is a monovalent organic group bonding to niobium atom via Nb—C bond, and at least one selected from a silane compound represented by formula (2) below:

$$(R^{20}O)_{4-x}Si(R^{21}-R^{22})_x \quad (2)$$

in which, in the formula (2), x is an integer of 1 or more and 3 or less, $R^{21}$ is a spacer group bonding to a silicon atom via Si—C bond, and $R^{22}$ is a hydrogen atom or a monovalent organic group.

The present invention can provide nanoparticles including inorganic oxide particles and having good dispersibility, a dispersion of nanoparticles including said nanoparticles, and a production method of said nanoparticles.

BRIEF DESCRIPTION OF THE DRAWINGS

FIG. 1 is a FIGURE that shows spectra of absorbance of dispersion including titanium oxide particles of Examples 2 and dispersion including titanium oxide particles of Comparative Example 1.

DETAILED DESCRIPTION OF THE INVENTION

<<Nanoparticles>>

Nanoparticles includes inorganic oxide particles where those surfaces are functionalized with a functionalizing agent described below. The nanoparticles may include other nanoparticles other than the inorganic oxide particles where those surfaces are functionalized with a functionalizing agent described below. Other nanoparticles may be inorganic particles or may be organic particles. Surfaces of other nanoparticles may be functionalized with a functionalizing agent described below or other functionalizing agent other than the functionalizing agent described below. A ratio of mass of the inorganic oxide particles where those surfaces are functionalized with a functionalizing agent described below is preferably 70% by mass or more, more preferably 80% by mass or more, further preferably 90% by mass or more, further more preferably 95% by mass or more, and particularly preferably 100% by mass relative to mass of the nanoparticles.

Generally, nanoparticles very easily aggregate in dispersion. However, the nanoparticles including the inorganic oxide particles where those surfaces are functionalized with a specific functionalizing agent described below are hard to aggregate, and stably dispersed in the dispersion. In addition, a resin composition or a cured product can be formed by adding the nanoparticles including the inorganic oxide particles where those surfaces are functionalized with a specific functionalizing agent described below to a composition including a resin or a polymerizable compound.

It should be noted that a mass of the inorganic oxide particles where those surfaces are functionalized with the functionalizing agent described below includes not only a mass of functional groups derived from the functionalizing agent but also a mass of organic groups included in the inorganic oxide particles due to a production method of the inorganic oxide particles.

Typically, the inorganic oxide particles are metal oxide particles or particles of oxide of metalloid element. Herein, the metalloid element is boron, silicon, germanium, arsenic, antimony, and tellurium. The inorganic oxide may be an oxide including only one metal element or metalloid element, and may be an oxide including two or more metal element or metalloid element in combination. The inorganic oxide particles are preferably silica particles, aluminum oxide particles (alumina particles), zirconium oxide particles (zirconia particles), titanium oxide particles, cerium (IV) oxide particle, and hafnium oxide particles. Among these inorganic oxide particles, silica particles, alumina particles, zirconia particles and titanium oxide particles are preferred. In view of easy formation of a material with high refractive index by adding the inorganic oxide particles to a composition for forming a high refractive index material, zirconia particles and titanium oxide particles are more preferred.

Herein, in the present claims and the present specification, "nanoparticles" are particles having an average primary particle diameter of 100 nm or less measured by X-ray diffraction method. The average primary particle diameter of the nanoparticles measured by the X-ray diffraction method is preferably 50 nm or less, more preferably 1 nm or more and nm or less, and even more preferably 3 nm or more and 20 nm or less.

The inorganic oxide particles included in the nanoparticles can be obtained by a conventional known method. For example, nanoparticles can be obtained according to synthesis treatment in liquid phase, hydrothermal synthesis treatment, and the like which nanoparticles are synthesized in a solvent in the presence or absence of a functionalizing agent optionally including a functionalizing agent described below.

<Functionalizing Agent>

A functionalizing agent includes at least one selected from niobium compound represented by formula (1) and at least one selected from silane compound represented by formula (2).

$$(R^{10}O)_{5-n}Nb(R^{11})_n \quad (1)$$

$$(R^{20}O)_{4-x}Si(R^{21}-R^{22})_x \quad (2)$$

In the formula (1), n is an integer of 0 or more and 4 or less. $R^{10}$ is an alkyl group. $R^{11}$ is a monovalent organic group bonding to niobium atom via Nb—C bond.

In the formula (2), x is an integer of 1 or more and 3 or less. $R^{20}$ is an alkyl group. $R^{21}$ is a spacer group bonding to a silicon atom via Si—C bond. $R^{22}$ is a hydrogen atom of a monovalent organic group.

The functionalizing agent may include other functionalizing agent other than the above-described niobium compound and the above-described silane compound. Examples of the other functionalizing agent include organic thiols such as an alkane thiol, organic carboxylic acids such as an aliphatic carboxylic acid, organic amines such as an alkyl amine, organic epoxy compound, and the like. It should be noted that the functionalizing agent may not include and preferably does not include functionalizing agent that corresponds to at least one selected from carboxylic acid, β-diketone, β-ketoester, α-hydroxy acid, β-hydroxy acid, amino acid, phosphonic acid, and phosphonate.

A ratio of sum of a mass of the above-described niobium compound and a mass of the above-described silane compound is preferably 70% by mass or more, more preferably 80% by mass or more, further preferably 90% by mass or more, further more preferably 95% by mass or more, and particularly preferably 100% by mass.

In the nanoparticles, MN/MS which is a ratio of MN:the number of moles of niobium atoms derived from the niobium compound represented by the formula (1) and MS:the number of moles of silicon atoms derived from the silane compound represented by the formula (2) is not particularly limited as long as desired effect is not impaired. MN/MS is preferably 0.01 or more and 2.0 or less, more preferably 0.1 or more and 1.0 or less, and further preferably 0.5 or more and 1.0 or less. In determination of MN/MS, each of values of MN and MS can be measured by performing an X-ray photoelectron spectroscopy (XPS) analysis on a sample of nanoparticles, respectively. More specifically, value of MN/MS can be determined by calculating a molar ratio of a part derived from the compound represented by the formula (1) and a part derived from the compound represented by the formula (2).

[Niobium Compound]

As described above, the niobium compound used as the functionalizing agent is a compound represented by formula (1) below.

$$(R^{10}O)_{5-n}Nb(R^{11})_n \quad (1)$$

In the formula (1), n is an integer of 0 or more and 4 or less. $R^{10}$ is an alkyl group. $R^{11}$ is a monovalent organic group bonding to niobium atom via Nb—C bond.

In the formula (1), n is an integer of 0 or more and 4 or less, preferably an integer of 0 or more and 2 or less, and more preferably 0 or 1. When n is an integer of 0 or more and 2 or less, a number of alkoxy groups represented by $R^{10}O$— that is a hydrolytically condensable functional group in the niobium compound represented by the formula (1) is sufficiently large. Therefore, it is easy to bond the niobium compound to the surfaces of the inorganic oxide well, and to functionalize the surfaces of the inorganic oxide particles well.

In the formula (1), $R^{10}$ is the alkyl group. In the formula (1), when there is more than one $R^{10}$, the plurality of $R^{10}$ may be the same or different. The alkyl group as $R^{10}$ may be linear or branched. A number of carbon atoms in the alkyl group as $R^{10}$ is not particularly limited, and is preferably 1 or more and 4 or less. Suitable specific examples of the alkyl group include methyl group, ethyl group, n-propyl group, isopropyl group, n-butyl group, isobutyl group, sec-butyl group, and tert-butyl group. Among alkyl groups as $R^{10}$, in view of reactivity when the inorganic particles are functionalized, methyl group and ethyl group are preferred, and methyl group is more preferred.

In the formula (1), $R^{11}$ is a monovalent organic group. With respect to $R^{11}$, "bonding to niobium atom via Nb—C bond" means that atom in $R^{11}$ bonding to niobium atom is a carbon atom in a partial structure represented by $Nb(R^{11})_n$ in the formula (1). The monovalent organic group is not particularly limited as long as desired effect does not impaired. In the formula (1), when there is more than one $R^{11}$, the plurality of $R^{11}$ may be the same or different. Examples of the monovalent organic group include an alkyl group, an alkenyl group, an alkynyl group, an aryl group, a (meth)acryloyl group, a (meth)acryloyloxyalkyl group, an epoxyalkyl group, an epoxyalkoxyalkyl group, a halogenated alkyl group, a mercaptoalkyl group, an aminoalkyl group, an aminoalkylaminoalkyl group, an aminoalkylaminoalkylaminoalkyl group, an imidazolylalkyl group, and an isocyanato group.

In addition, a group represented by $—(R^{12}—O)_{n0}—R^{13}$ is also preferred as the monovalent organic group. $R^{12}$ is an alkyl group having 1 or more and 4 or less carbon atoms, and ethane-1,2-diyl group (ethylene group), propane-1,3-diyl group, or propane-1,2-diyl group are preferred. $R^{13}$ is a hydrogen group or an alkyl group having 1 or more and 4 or less carbon atoms, and methyl group or ethyl group is preferred. n0 is an integer of 1 or more and 20 or less.

The alkyl group as the monovalent organic group may be linear or branched. A number of carbon atoms in the alkyl group is not particularly limited, and is preferably 1 or more and 4 or less. Suitable specific examples of the alkyl group include methyl group, ethyl group, n-propyl group, isopropyl group, n-butyl group, isobutyl group, sec-butyl group, and tert-butyl group.

The alkenyl group as the monovalent organic group may be linear or branched. A number of carbon atoms in the alkenyl group is not particularly limited, and is preferably 2 or more and 4 or less. Suitable specific examples of the alkenyl group include a viny group, allyl group (prop-2-en-1-yl group), prop-1-en-1-yl group, but-1-en-1-yl group, but-2-en-1-yl group, and but-3-en-1-yl group.

The alkynyl group as the monovalent organic group may be linear or branched. A number of carbon atoms in the alkynyl group is not particularly limited, and is preferably 2 or more and 4 or less. Suitable specific examples of the alkynyl group include ethynyl group, propargyl group (prop-2-yn-1-yl group), prop-1-yn-1-yl group, but-1-yn-1-yl group, but-2-yn-1-yl group, and but-3-yn-1-yl group.

The aryl group as the monovalent organic group may be a monocyclic group or a polycyclic group. The polycyclic group may be a group in which two or more aromatic rings are condensed as naphthyl group or a group a group in which two or more aromatic rings are bonded via single bond(s) as biphenylyl group. A number of carbon atoms in the aryl group is not particularly limited, and preferably 6 or more and 10 or less. Suitable specific examples of the aryl group include phenyl group, naphthalene-1-yl group, and naphthalene-2-yl group.

A saturated aliphatic hydrocarbon chain included in the (meth)acryloyloxyalkyl group as the monovalent organic group may be linear or branched. The number of carbon atoms in the saturated aliphatic hydrocarbon chain included in the (meth)acryloyloxyalkyl group as the monovalent organic group is preferably 1 or more and 10 or less, and more preferably 1 or more and 6 or less. Suitable examples of the (meth)acryloyoxyalkyl group include (meth)acryloyoxymethyl group, 2-(meth)acryloyoxyethyl group, 3-(meth)acryloyoxypropyl group, 4-(meth)acryloyoxybutyl group, 5-(meth)acryloyoxypentyl group, 6-(meth)acryloyoxyhexyl group, 7-(meth)acryloyoxyheptyl group, 8-(meth)acryloyoxyoctyl group, 9-(meth)acryloyoxynonyl group, and 10-(meth)acryloyoxydecyl group.

A saturated aliphatic hydrocarbon chain included in the epoxyalkyl group as the monovalent organic group may be linear or branched. The number of carbon atoms in the epoxyalkyl group is not particularly limited, and is preferably 2 or more and 10 or less, and more preferably 2 or more and 6 or less. Suitable specific examples of the epoxyalkyl group include oxyranyl group, glycidyl group (2,3-epoxypropyl group), 3,4-epoxybutyl group, 4,5-epoxypentyl group, 5,6-epoxyhexyl group, 6,7-epoxyheptyl group, 7,8-epoxyoctyl group, 8,9-epoxynonyl group, and 9,10-epoxydecyl group.

The saturated aliphatic hydrocarbon chain included in the epoxyalkoxyalkyl group as the monovalent organic group may be linear or branched. In an epoxyalkoxy group in the epoxyalkoxyalkyl group, the epoxyalkyl group bonding to an oxygen atom is the same as the epoxyalkyl group as the above-described monovalent organic group. In the epoxyalkoxyalkyl group, a number of carbon atoms in the alkylene group bonding to the epoxyalkoxy group is preferably 1 or more and or less, and more preferably 1 or more and 6 or less. Suitable specific examples of the epoxyalkoxyalkyl group include 2-glycidyloxymethoxy group, 3-glycidyloxypropyl group, 4-glycidyloxybutyl group, 5-glycidyloxypentyl group, 6-glycidyloxyhexyl group, 7-glycidyloxyheptyl group, 8-glycidyloxyoctyl group, 9-glycidyloxynonyl group, 10-glycidyloxydecyl group, 2-(3,4-epoxybutyloxy)ethyl group, 3-(3,4-epoxybutyloxy)propyl group, 4-(3,4-epoxybutyloxy)butyl group, 5-(3,4-epoxybutyloxy)pentyl group, 6-(3,4-epoxybutyloxy)hexyl group, 7-(3,4-epoxybutyloxy)heptyl group, 8-(3,4-epoxybutyloxy)octyl group, 9-(3,4-epoxybutyloxy)nonyl group, 10-(3,4-epoxybutyloxy)decyl group, 2-(4,5-epoxypentyloxy)ethyl group, 3-(4,5-epoxypenty oxy)propyl group, 4-(3,4-epoxybutyloxy)butyl group, 5-(4,5-epoxypenty oxy)pentyl group, 6-(4,5-epoxypenty oxy)hexyl group, 7-(4,5-epoxypenty oxy)heptyl group, 8-(4,5-epoxypenty oxy)octyl group, 9-(4,5-epoxypenty oxy)nonyl group, and 10-(4,5-epoxypenty oxy)decyl group.

The halogenated alkyl group as the monovalent organic group may be linear or branched. The halogenated alkyl group may be a halogenated alkyl group in which a part of hydrogen atoms possessed by an alkyl group is substituted with halogen atom(s) or a perhalogenated alkyl group in which all hydrogen atoms are substituted with halogen atoms. As a halogen atom which the halogenated alkyl group may possess, fluorine atom, chlorine atom, bromine atom, and iodine atom are exemplified. As a halogen atom, fluorine atom, chlorine atom, and bromine atom are preferred. The halogenated alkyl group may include two or more types of halogen atoms. A number of carbon atoms in the halogenated alkyl group is not particularly limited, preferably 1 or more and 10 or less, and more preferably 1 or more and 6 or less. Suitable specific examples of the halogenated alkyl group include chloroalkyl groups such as chloromethyl group, dichloromethyl group, trichloromethyl group, 2-chloroethyl group, 2,2-dichloroethyl group, 2,2,2-trichloroethyl group, pentachloroethyl group, 2-chloropropyl group, heptachloropropyl group, 4-chlorobutyl group, nonachlorobutyl group, 5-chloropentyl group, undecachloropentyl group, 6-chlorohexyl group, tridecachlorohexyl group, 7-chloroheptyl group, pentadecachloroheptyl group, o-cholorooctyl group, heptadecachlorooctyl group, 9-chlorononyl group, nonadecachlorononyl group, 10-chlorodecyl group, and henicosachlorodecyl group; bromoalkyl groups such as bromomethyl group, dibromomethyl group, tribromomethyl group, 2-bromoethyl group, 2,2-dibromoethyl group, 2,2,2-tribromoethyl group, pentabromoethyl group, 3-bromopropyl group, heptabromopropyl group, 4-bromobutyl group, nonabromobutyl group, 5-bromopentyl group, undecabromopentyl group, 6-bromohexyl group, toridecabromohexyl group, 7-bromoheptyl group, pentadecabromoheptyl group, 8-bromooctyl group, heptadecabromooctyl group, 9-bromononyl group, nonadecabromononyl group, 10-bromodecyl group, and henicosabromodecyl group; fluoroalkyl groups such as fluoromethyl group, difluoromethyl group, trifluoromethyl group, 2-fluoroethyl group, 2,2-difluoroethyl group, 2,2,2-trifluoroethyl group, pentafluoroethyl group, 3-fluoropropyl group, heptafluoropropyl group, 4-fluorobutyl group, nonafluorobutyl group, 5-fluoropentyl group, undecafluoropentyl group, 6-fluorohexyl group, tridecafluorohexyl group, 7-fluoropentyl group, pentadecafluoroheptyl group, 8-fluorooctyl group, heptadecafluorooctyl group, 9-fluorononyl group, nonadecafluorononyl group, 10-fluorodecyl group, and henicosafluorodecyl group.

The mercaptoalkyl group as the monovalent organic group may be linear or branched. A number of carbon atoms in the mercaptoalkyl group is not particularly limited, preferably 1 or more and 10 or less, and more preferably 1 or more and 6 or less. Suitable specific examples of the mercaptoalkyl group include mercaptomethyl group, 2-mercaptoethyl group, 3-mercaptopropyl group, 4-mercaptobutyl group, 5-mercaptopentyl group, 6-mercaptohexy group, 7-mercaptoheptyl group, 8-mercaptooctyl group, 9-mercaptononyl group, and 10-mercaptodecyl group.

The aminoalkyl group as the monovalent organic group may be linear or branched. A number of carbon atoms is not particularly limited, preferably 1 or more and 10 or less, and more preferably 1 or more and 6 or less. Suitable specific examples of the aminoalkyl group include aminomethyl group, 2-aminoethyl group, 3-aminopropyl group, 4-aminobutyl group, 5-aminopentyl group, 6-aminohexyl group, 7-aminoheptyl group, 8-aminooctyl group, 9-aminononyl group, and 10-aminodecyl group.

The aminoalkylaminoalkyl group as the monovalent organic group may be linear or branched. A number of carbon atoms in each of two alkyl group is not particularly limited, preferably 1 or more and 10 or less, and more preferably 1 or more and 6 or less. Suitable specific examples of the aminoalkylaminoalkyl group include 2-(aminomethylamino)ethyl group, 3-(aminomethylamino)propyl group, 4-(aminomethylamino)butyl group, 5-(aminomethylamino)pentyl group, 6-(aminomethylamino)hexyl group, 7-(aminomethylamino)heptyl group, 8-(aminomethylamino)octyl group, 9-(aminomethylamino)nonyl group, 10-(aminomethylamino)decyl group, 2-(2-aminoethylamino)ethyl group, 3-(2-aminoethylamino)propyl group, 4-(2-aminoethylamino)butyl group, 5-(2-aminoethylamino)pentyl group, 6-(2-aminoethylamino)hexyl group, 7-(2-aminoethylamino)heptyl group, 8-(2-aminoethylamino)octyl group, 9-(2-aminoethylamino)nonyl group, 10-(2-aminoethylamino)decyl group, 2-(3-aminopropylamino)ethyl group, 3-(3-aminopropylamino)propyl group, 4-(3-aminopropylamino)butyl group, 5-(3-aminopropylamino)pentyl group, 6-(3-aminopropylamino)hexyl group, 7-(3-aminopropylamino)heptyl group, 8-(3-aminopropylamino)octyl group, 9-(3-aminopropylamino)nonyl group, 10-(3-aminopropylamino)decyl group, and the like.

The aminoalkylaminoalkylaminoalkyl group as the monovalent organic group may be linear or branched. A number of carbon atoms in each of the three alkylene groups included in the aminoalkylaminoalkylaminoalkyl group is not particularly limited, preferably 1 or more and or less, and more preferably 1 or more and 6 or less. Suitable specific examples of the aminoalkylaminoalkylaminoalkyl group include 2-[2-(aminomethylamino)ethylamino]ethyl group, 3-[2-(aminomethylamino)ethylamino]propyl group, 4-[2-(aminomethylamino)ethylamino]butyl group, 5-[2-(aminomethylamino)ethylamino]pentyl group, 6-[2-(aminomethylamino)ethylamino]hexyl group, 7-[2-(aminomethylamino)ethylamino]heptyl group, 8-[2-(aminomethylamino)ethylamino]octyl group, 9-[2-(aminomethylamino)ethylamino]nonyl group, 10-[2-(aminomethylamino)ethylamino]decyl group, 2-[2-(2-aminoethylamino)ethylamino]ethyl group, 3-[2-(2-aminoethylamino)ethylamino]propyl group, 4-[2-(2-aminoethylamino)ethylamino]butyl group, 5-[2-(2-aminoethylamino)ethylamino]pentyl group, 6-[2-(2-aminoethylamino)ethylamino]hexyl group, 7-[2-(2-aminoethylamino)ethylamino]heptyl group, 8-[2-(2-aminoethylamino)ethylamino]octyl group, 9-[2-(2-aminoethylamino)ethylamino]nonyl group, 10-[2-(2-aminoethylamino)ethylamino]decyl group, 2-[2-(3-aminopropylamino)ethylamino]ethyl group, 3-[2-(3-aminopropylamino)ethylamino]propyl group, 4-[2-(3-aminopropylamino)ethylamino]butyl group, 5-[2-(3-aminopropylamino)ethylamino]pentyl group, 6-[2-(3-aminopropylamino)ethylamino]hexyl group, 7-[2-(3-aminopropylamino)ethylamino]heptyl group, 8-[2-(3-aminopropylamino)ethylamino]octyl group, 9-[2-(3-aminopropylamino)ethylamino]nonyl group, 10-[2-(3-aminopropylamino)ethylamino]decyl group, 2-[3-(aminomethylamino)propylamino]ethyl group, 3-[3-(aminomethylamino)propylamino]propyl group, 4-[3-(aminomethylamino)propylamino]butyl group, 5-[3-(aminomethylamino)propylamino]pentyl group, 6-[3-(aminomethylamino)propylamino]hexyl group, 7-[3-(aminomethylamino)propylamino]heptyl group, 8-[3-(aminomethylamino)propylamino]octyl group, 9-[3-(aminomethylamino)propylamino]nonyl group, 10-[3-(aminomethylamino)propylamino]decyl group, 2-[3-(2-aminoethylamino)propylamino]ethyl group, 3-[3-(2-aminoethylamino)propylamino]propyl group, 4-[3-(2-aminoethylamino)propylamino]butyl group, 5-[3-(2-aminoethylamino)propylamino]pentyl group, 6-[3-(2-aminoethylamino)propylamino]hexyl group, 7-[3-(2-aminoethylamino)propylamino]heptyl group, 8-[3-(2-aminoethylamino)propylamino]octyl group, 9-[3-(2-aminoethylamino)propylamino]nonyl group, 10-[3-(2-aminoethylamino)propylamino]decyl group, 2-[3-(3-aminopropylamino)propylamino]ethyl group, 3-[3-(3-aminopropylamino)propylamino]propyl group, 4-[3-(3-aminopropylamino)propylamino]butyl group, 5-[3-(3-aminopropylamino)propylamino]pentyl group, 6-[3-(3-aminopropylamino)propylamino]hexyl group, 7-[3-(3-aminopropylamino)propylamino]heptyl group, 8-[3-(3-aminopropylamino)propylamino]octyl group, 9-[3-(3-aminopropylamino)propylamino]nonyl group, 10-[3-(3-aminopropylamino)propylamino]decyl group, and the like.

The imidazolylalkyl group as the monovalent organic group may be linear or branched. A number of carbon atoms in a saturated aliphatic hydrocarbon chain included in the imidazolylalkyl group is not particularly limited, preferably 1 or more and or less, more preferably 1 or more and 6 or less. Suitable specific examples of the imidazolylalkyl group include (1H-imidazole-1-yl)methyl group, 2-(1H-imidazole-1-yl)ethyl group, 3-(1H-imidazole-1-yl)propyl group, 4-(1H-imidazole-1-yl)butyl group, 5-(1H-imidazole-1-yl)pentyl group, 6-(1H-imidazole-1-yl)hexyl group, 7-(1H-imidazole-1-yl)heptyl group, 8-(1H-imidazole-1-yl)octyl group, 9-(1H-imidazole-1-yl)nonyl group, 10-(1H-imidazole-1-yl)decyl group, (1H-imidazole-2-yl)methyl group, 2-(1H-imidazole-2-yl)ethyl group, 3-(1H-imidazole-2-yl)propyl group, 4-(1H-imidazole-2-yl)butyl group, 5-(1H-imidazole-2-yl)pentyl group, 6-(1H-imidazole-2-yl)hexyl group, 7-(1H-imidazole-2-yl)heptyl group, 8-(1H-imidazole-2-yl)octyl group, 9-(1H-imidazole-2-yl)nonyl group, 10-(1H-imidazole-2-yl)decyl group, (1H-imidazole-4-yl)methyl group, 2-(1H-imidazole-4-yl)ethyl group, 3-(1H-imidazole-4-yl)propyl group, 4-(1H-imidazole-4-yl)butyl group, 5-(1H-imidazole-4-yl)pentyl group, 6-(1H-imidazole-4-yl)hexyl group, 7-(1H-imidazole-4-yl)heptyl group, 8-(1H-imidazole-4-yl)octyl group, 9-(1H-imidazole-4-yl)nonyl group, and 10-(1H-imidazole-4-yl)decyl group.

Suitable specific examples of the niobium compound represented by the formula (1) include pentaalkoxyniobiums such as pentamethoxyniobium, pentaethoxyniobium, penta-n-propoxyniobium, pentaisopropoxyniobium, and penta-n-butoxyniobium; monoalkyltetraalkoxyniobiums such as methyltetramethoxyniobium, methyltetraethoxyniobium, methyltetra-n-propoxyniobium, methyltetraisopropoxyniobium, methyltetra-n-butoxyniobium, ethylte tramethoxyniobium, ethyltetraethoxyniobium, ethyltetra-n-propoxyniobium, ethyltetraisopropxyniobium, and ethyltetra-n-butoxyniobium.

[Silane Compound]

As described above, the silane compound used as the functionalizing agent is the compound represented by the following formula (2).

$$(R^{20}O)_{4-x}Si(R^{21}-R^{22})_x \qquad (2)$$

In the formula (2), x is an integer of 1 or more and 3 or less. $R^{20}$ is an alkyl group. $R^{21}$ is a spacer group bonding to silicon atom via Si—C bond. $R^{22}$ is a hydrogen atom of a monovalent organic group.

In the formula (2), x is an integer of 1 or more and 3 or less, preferably 1 or 2, and more preferably 1. When x is 1 or 2, the silane compound represented by the formula (2) is hydrolytically condensed well to the surfaces of the inorganic oxide particles, and hydrolysis-condensation of the niobium compound represented by the formula (a) also easily proceeds.

In the formula (2), $R^{20}$ is an alkyl group. In the formula (2), when there is more than one $R^{20}$, the plurality of $R^{20}$ may be the same or different. The alkyl group as $R^{20}$ may be linear or branched. A number of carbon atoms in the alkyl group as $R^{20}$ is not particularly limited, and preferably 1 or more and 4 or less. Suitable specific examples of the alkyl group include methyl group, ethyl group, n-propyl group, isopropyl group, n-butyl group, isobutyl group, sec-butyl group, and tert-butyl group. In view of reactivity during functionalization of the inorganic oxide particles, among the alkyl group as $R^{20}$, the methyl group and the ethyl group are preferred, and the methyl group is more preferred.

In the formula (2), $R^{21}$ is a spacer group. With respect to $R^{21}$, "bonding to silicon atom via Si—C bond" means that atom in $R^{21}$ bonding to silicon atom is a carbon atom in a partial structure represented by $Si(R^{21}—R^{22})_x$ in the formula (2). In the formula (2), when there is more than one $R^{21}$, the plurality of $R^{21}$ may be the same or different from. The spacer group as $R^{21}$ is not particularly limited as long as steric hindrance of the group represented by $—R^{21}—R^{22}$ improves the dispersibility of the nanoparticles. As the spacer group as $R^{21}$, an organic group having 1 or more and 20 or less carbon atoms is preferred, and a hydrocarbon group having 1 or more and 20 or less carbon atoms is more preferred. Typical examples of the spacer group include an optionally substituted alkylene group, an optionally substituted alkenylene group, an optionally substituted arylene group, and a divalent group in which two hydrogen atoms are excluded from an aryl group in an optionally substituted aralkyl group.

The alkylene group as the spacer group may be linear or branched. A number of carbon atoms in the alkylene group as the spacer group is preferably 1 or more and 20 or less, more preferably 1 or more and 10 or less, and even more preferably 2 or more and 8 or less. Specific examples of the alkylene group as the spacer group include methylene group, ethane-1,2-diyl group (ethylene group), ethane-1,1-diyl group, propane-1,3-diyl group, propane-1,2-diyl group, butane-1,4-diyl group, butane-1,2-diyl group, butane-1,3-diyl group, butane-2,3-diyl group, pentane-1,5-diyl group, hexane-1,6-diyl group, heptane-1,7-diyl group, octane-1,8-diyl group, nonane-1,9-diyl group, decane-1,10-diyl group, undecane-1,11-diyl group, dodecane-1,12-diyl group, tridecane-1,13-diyl group, tetradecane-1,14-diyl group, pentadecane-1,15-diyl group, hexadecane-1,16-diyl group, heptadecane-1,17-diyl group, octadecane-1,18-diyl group, nonadecane-1,19-diyl group, and icosane-1,20-diyl group. Examples of a substituent which the alkylene group as the spacer group may have include a halogen atom, an alkoxy group having 1 or more and 4 or less carbon atoms, a mercapto group, an alkylthio group having 1 or more and 4 or less carbon atoms, a cyano group, and the like.

The alkenylene group as the spacer group may be linear or branched. A number of carbon atoms in the alkenylene group as the spacer group is preferably 2 or more and 20 or less, more preferably 2 or more and 10 or less, and even more preferably 2 or more and 8 or less. Specific examples of the alkenylene group as the spacer group include ethene-1,2-diyl group, prop-2-en-1,3-diyl group, prop-2-en-1,2-diyl group, prop-1-en-1,2-diyl group, but-3-en-1,4-diyl group, pent-4-en-1,5-diyl group, hex-5-en-1,6-diyl group, hept-6-en-1,7-diyl group, oct-7-en-1,6-diyl group, non-8-en-1,8-diydl group, dec-9-en-1,10-diyl group, aundec-10-en-1,11-diyl group, dodec-11-en-1,12-diyl group, tridec-12-en-1,13-diyl group, tetradec-13-en-1,14-diyl group, pentadec-14-en-1,15-diyl group, hexadic-15-en-1,16-diyl group, heptadec-16-en-1,17-diyl group, octadic-17-en-1,18-diyl group, nonadec-18-en-1,19-diyl group, and icos-19-en-1,20-diyl group. Examples of a substituent which the alkenylene group as the spacer group may have include a halogen atom, an alkoxy group having 1 or more and 4 or less carbon atoms, a mercapto group, an alkylthio group having 1 or more and 4 or less carbon atoms, a cyano group, and the like.

A number of carbon atoms in the arylene group as the spacer group is preferably 6 or more and 20 or less, and more preferably 6 or more and 10 or less. Specific examples of the arylene group as the spacer group include o-phenylene group, m-phenylene group, p-phenylene group, naphthalene-1,2-diyl group, naphthalene-1,3-diyl group, naphthalene-1,4-diyl group, naphthalene-1,5-diyl group, naphthalene-1,6-diyl group, naphthalene-1,7-diyl group, naphthalene-1,8-diyl group, naphthalene-2,3-diyl group, naphthalene-2,6-diyl group, and naphthalene-2,7-diyl group. A number of carbon atoms in the divalent group in which one hydrogen atom is excluded from the aryl group in the optionally substituted aralkyl group as the spacer group is preferably 7 or more and 20 or less, and more preferably 7 or more and 12 or less. Suitable examples of the divalent group in which one hydrogen atom is excluded from an aryl group in the optionally substituted aralkyl group include —$CH_2$-Ph-, —$CH_2CH_2$-Ph-, —$CH_2$-Np-, and —$CH_2CH_2$-Np-. In these groups, Ph is an o-phenylene group, a m-phenylene group, or a p-phenylene group, and preferably the p-phenylene group. Np is naphthalene-1,2-diyl group, naphthalene-1,3-diyl group, naphthalene-1,4-diyl group, naphthalene-1,5-diyl group, naphthalene-1,6-diyl group, naphthalene-1,7-diyl group, naphthalene-1,8-diyl group, naphthalene-2,3-diyl group, naphthalene-2,6-diyl group, or naphthalene-2,7-diyl group, and preferably the naphthalene-1,2-diyl group, the naphthalene-1,4-diyl group, the naphthalene-2,3-diyl group, the naphthalene-2,6-diyl group, or the naphthalene-2,7-diyl group. Examples of the substituent which the arylene group, and the divalent group in which one hydrogen atom is excluded from the aryl group in the optionally substituted aralkyl group may possess include halogen atom, alkyl group having 1 or more and 4 or less carbon atoms, alkoxy group having 1 or more and 4 or less carbon atoms, mercapto group, alkylthio group having 1 or more and 4 or less carbon atoms, nitro group, and cyano group.

In the formula (2), $R^{22}$ is a hydrogen atom or a monovalent organic group. $R^{22}$ is preferably the hydrogen atom. In the formula (2), when there is more than one $R^{22}$, the plurality of $R^{22}$ may be the same or different from. The monovalent organic group as $R^{22}$ is the same as the monovalent organic group described for $R^{11}$.

Suitable specific examples of the silane compound represented by the formula (2) include linear branched alkyltrimethoxysilanes such as methyltrimethoxysilane, an ethyltrimethoxysilane, n-propyltrimethoxysilane, n-butyltrimethoxysilane, n-pentylgrimethoxysilane, n-hexyltrimethoxysilane, n-octyltrimethoxysilane, n-nonyltrimethoxysilane, n-decyltrimethoxysilane, n-dodecyltrimethoxysilane, n-hexadecyltrimethoxysilane, and n-octadecyltrimethoxysilane; linear or branched alkyltriethoxysilanes such as methyltriethoxysilane, ethyltriethoxysilane, n-propyltriethoxysilane, n-butyltriethoxysilane, n-pentyltriethoxysilane, n-hexyltriethoxysilane, n-octyltriethoxysilane, n-nonyltriethoxysilane, n-decyltriethoxysilane, n-dodecyltriethoxysilane, n-hexadecyltriethoxysilane, and n-ocatadecyltriethoxysilan; (meth)acryloyloxyalkyltrimethoxysilanes such as 2-(meth)acryloyloxyethyltrimethoxysilane, 3-(meth)acryloyloxypropytrimethoxysilane, 4-(meth)acryloyloxybutyltrimethoxysilane, 5-(meth)acryloyloxypentyltrimethoxysilane, 6-(meth)acryloyloxyhexyltrimethoxysilane, 7-(meth)acryloyloxyheptyltrimethoxysilane, 8-(meth)acryloyloxyoctyltrimethoxysilane, 9-(meth)acryloyloxynonyltrimethoxysilane, and 10-(meth)acryloyloxydecyltrimethoxysilane; (meth)acryloyloxyalkyltriethoxysilanes such as 2-(meth)acryloyloxyethyltriethoxysilane, 3-(meth)acryloyloxypropytriethoxysilane, 4-(meth)acryloyloxybutyltriethoxysilane, 5-(meth)acryloyloxypentyltriethoxysilane, 6-(meth)acryloyloxyhexyltriethoxysilane, 7-(meth)acryloyloxyheptyltriethoxysilane, 8-(meth)acryloyloxyoctyltriethoxysilane, 9-(meth)acryloyloxynonyltriethoxysilane, and 10-(meth)acryloyloxydecyltriethoxysilane; glycidyloxyalkyltrimethoxysilanes such as 2-glycidyloxyethyltrimethoxysilane, 3-glycidyloxypropyltrimethoxysilane, 4-glycidyloxybutyltrimethoxysilane, 5-glycidyloxypentyltrimethoxysilane,
6-glycidyloxyhexyltrimethoxysilane, 7-glycidyloxyheptyltrimethoxysilane, 8-glycidyloxyoctyltrimethoxysilane, 9-glycidyloxynonyltrimethoxysilane, and 10-glydidyloxydecyltrimethoxysilane; glycidyloxyalkyltriethoxysilanes such as 2-glycidyloxyethyltriethoxysilane, 3-glycidyloxypropyltriethoxysilane, 4-glycidyloxybutyltriethoxysilane, 5-glycidyloxypentyltriethoxysilane, 6-glycidyloxyhexyltriethoxysilane, 7-glycidyloxyheptyltriethoxysilane, 8-glycidyloxyoctyltriethoxysilane, 9-glycidyloxynonyltriethoxysilane, and 10-glydidyloxydecyltriethoxysilane; aminoalkyltrimethoxysilanes such as 2-aminoethyltrimethoxysilane, 3-aminopropyltrimethoxysilane, 4-aminobutyltrimethoxysilane, 5-aminopentyltrimethoxysilane, 6-aminohexyltrimethoxysilane, 7-aminoheptyltrimethoxysilane, 8-aminooctyltrimethoxysilane, 9-aminononyltrimethoxysilane, and 10-aminodecyltrimethoxysilane; aminoalkyltriethoxysilanes such as 2-aminoethyltriethoxysilane, 3-aminopropyltriethoxysilane, 4-aminobutyltriethoxysilane, 5-aminopentyltriethoxysilane, 6-aminohexyltriethoxysilane, 7-aminoheptyltriethoxysilane, 8-aminooctyltriethoxysilane, 9-aminononyltriethoxysilane, and 10-aminodecyltriethoxysilane; aryl group-containing trimethoxysilanes or aryl group-containing triethoxysilanes such as phenyltrimethoxysilane, phenylethyltrimethoxysilane, phenyltriethoxysilane, and phenylethyltriethoxysilane; alkyleneoxy group-containing trimethoxysilanes or alkyleneoxy group-containing triethoxysilanes such as 3-{2-methoxy[poly(ethyleneoxy)]}propyltrimethoxysilane, 3-{2-methoxy[tri(ethyleneoxy)]}propyltrimethoxysilan e, 3-{2-methoxy[poly(ethyleneoxy)]}propyltriethoxysilane, and 3-{2-methoxy[tri(ethyleneoxy)]}propyltrimethoxysilane; unsaturated group-containing trimethoxysilanes or unsaturated group-containing triethoxysilanes such as vinyltrimethoxysilane, vinyltriethoxysilane, allyltrimethoxyxilane, allyltriethoxysilane, 1-hexenyltrimethoxysilane, 1-hexenyltriethoxysilane, 1-octenyltrimethoxyxilane, and 1-octenyltriethoxysilane; mercapto group-containing trialkoxysilanes such as 3-mercaptopropyltrimethoxyxilane and 3-mercaptopropyltriethoxyxilane; isocyanato group-containing trialkoxysilanes such as 3-isocyanatopropyltrimethoxyxilane and 3-isocyanatopropyltriethoxysilane.

<Reaction of Inorganic Oxide Particles with Functionalizing Agent>

The inorganic oxide particles where those surfaces are functionalized with the above-described functionalizing agent can be prepared by reacting the inorganic oxide and the functionalizing agent.

In other words, the inorganic oxide particles where those surfaces are functionalized can be prepared by reacting the surfaces of the inorganic oxide particles with the functionalizing agent including at least one selected from the niobium compounds represented by the following formula (1)

and at least one selected from the silane compounds represented by the following formula (2)

$$(R^{10}O)_{5-n}Nb(R^{11})_n \quad (1)$$

$$(R^{20}O)_{4-x}Si(R^{21}—R^{22})_x \quad (2)$$

In the formula (1), n is an integer of 0 or more and 4 or less, $R^{10}$ is an alkyl group, and $R^{11}$ is a monovalent organic group.

In the formula (2), x is an integer of 1 or more and 3 or less, $R^{20}$ is an alkyl group, $R^{21}$ is a spacer group, and $R^{22}$ is a hydrogen atom of a monovalent organic group.

When the inorganic oxide particles are reacted with the functionalizing agent, the silane compound may be reacted with the inorganic oxide particles after reaction of the niobium compound with the inorganic oxide particles, the niobium compound may be reacted with the inorganic oxide particles after reaction of the silane compound with the inorganic oxide particle, the niobium compound and the silane compound may be simultaneously reacted with the inorganic oxide particles, and a hydrolysis-condensation product of the niobium compound and the silane compound may be reacted with the inorganic oxide particles. On the surface of the inorganic oxide particles, the niobium compound and the silane compound may or may not be reacted with each other. In other words, Si—O—Nb bonds may or may not be formed on the surfaces of the inorganic oxide particles. The formation of the Si—O—Nb bonds can be confirmed by analysis by Fourier transform infrared spectrophotometric method (FT-IR). Specifically, the presence or absence of the Si—O—Nb bonds can be confirmed based on FT-IR spectrum of the inorganic oxide particles where those surfaces are functionalized with the niobium compound and the silane compound. In the FT-IR spectrum, a wave number corresponding to the Si—O—Nb bonds are a wave number around 910 cm-1. The order of the reactions can be set appropriately according to value of n in the aforementioned formula (1) with respect to the niobium compound. For example, when n is an integer of 0 or more and 2 or less, it is preferable that the inorganic oxide particles are further reacted with the niobium compound after the reaction of the silane compound with the inorganic oxide particles. In this way, the niobium compound can bond to the surfaces of the inorganic oxide particles while inhibiting the aggregation of the inorganic oxide particles. As a result, dispersibility is improved. In addition, the resulting functionalized inorganic oxide particles have a higher refractive index and a transparency of a dispersion including them is also improved.

When the functionalizing agent includes other functionalizing agent than the niobium compound and the silane compound, a functionalization of the surfaces of the inorganic oxide particles with other functionalizing agent may be carried out before or after the reaction of the inorganic oxide particles with the niobium compound and the silane compound or at the same time as the reaction of the inorganic oxide particles with the niobium compound and the silane compound. In addition, the functionalization of the surfaces of the inorganic oxide particles with other functionalizing agent may carried out between the reaction of the inorganic oxide particles with the niobium compound and the reaction of the inorganic oxide particles with the silane compound.

The reaction of the inorganic oxide particles with the niobium compound and the silane compound as the functionalizing agent may be carried out in the presence or absence of a dispersion medium which disperses the inorganic oxide particles, and is preferably carried out in the presence of the dispersion medium. The dispersion medium preferably includes an organic solvent. As the organic solvent, the organic solvent which is suitably used as the dispersion medium described below for the dispersion is preferably used.

An amount of the dispersion medium is not particularly limited when the inorganic oxide particles are reacted with the functionalized agent. The amount of the dispersion medium is preferably 10 parts by mass or more and 5000 parts by mass or less, more preferably 100 parts by mass or more and 3000 parts by mass or less relative to 100 parts by mass of the inorganic oxide particles.

The reaction on the inorganic oxide particles and the niobium compound and the silane compound is a hydrolysis-condensation reaction between functional groups such as hydroxy group exist on the surfaces of the inorganic oxide particles and the alkoxy groups possessed by the niobium compound and the silane compound. Therefore, the reaction of the inorganic oxide particles with the niobium compound and the silane compound is usually carried out in the presence of water. When the reaction of the inorganic oxide particles with the niobium compound and the silane compound is carried out, water may be added to the dispersion medium, and the reaction may be carried out under an atmosphere such as air including water without addition of water to the dispersion medium. In a case that water is added to the dispersion medium, a mass of water is included in a mass of dispersion medium.

When the surfaces of the inorganic oxide particles are functionalized, total amount of the niobium compound and the silane compound is not particularly limited as long as a desired effect can be achieved. In view of suppressing aggregation of the inorganic oxide particles, an amount of the silane compound is preferably parts by mass ore more and 100 parts by mass or less, more preferably 10 parts by mass or more and 45 prats by mass or less, and further preferably 10 parts by mass or more and 40 parts by mass or less relative to 100 parts by mass of the inorganic oxide particles where those surfaces are not functionalized.

The niobium compound is preferably used in such an amount that the value of MN/MS which is a ratio of MN:the number of moles of niobium atoms derived from the niobium compound represented by the formula (1) and MS:the number of moles of silicon atoms derived from the silane compound represented by the formula (2) is within the preferred range described above. Typically, a mass of the niobium compound is preferably 1 part by mass or more and 100 parts by mass or less, more preferably 2 parts by mass or 45 parts by mass or less, and further preferably 3 parts by mass or more and 40 parts by mass or less relative to 100 parts by mass of the inorganic oxide particles where those surfaces are not functionalized.

When the inorganic oxide particles are reacted with the niobium compound and the silane compound, a temperature is not particularly limited as long as the reaction proceeds well. The reaction temperature is preferably 20° C. or higher and 200° C. or lower, and more preferably 50° C. or higher and 150° C. or lower.

A time for the reaction of the inorganic oxide particles with the niobium compound and the silane compound is not particularly limited as long as the reaction proceeds well. Depending on the reaction temperature, typically, the reaction time is preferably 1 minute or longer and 12 hours or shorter, more preferably 5 minutes or longer and 6 hours or shorter, and further preferably 10 minutes or longer and 1 hour or shorter.

The nanoparticles including the inorganic oxide particles where those surfaces are functionalized may be used in the form of a dispersion as is after the reaction as described above, or may be used after being washed by an organic solvent. As an organic solvent used for washing, for example, aliphatic hydrocarbon solvents such as n-pentane, n-hexane, and n-heptane are preferred. As a method for washing nanoparticles after the reaction of the inorganic oxide particles and the functionalized agent, for example, a method including redispersing precipitates in an organic solvent for washing after centrifuge of the nanoparticles in the reaction liquid and removal of supernatant liquid is exemplified. The nanoparticles washed by redispersing in the organic solvent are preferably dispersed in the desired dispersion medium again to use the dispersion as the dispersion of nanoparticles described below after collection by methods such as centrifuge.

The nanoparticles including the inorganic oxide particles where those surfaces are functionalized obtained as described above are used for various applications depending on the type of inorganic oxide.

<<Dispersion of Nanoparticles>>

The dispersion of the nanoparticles (hereinafter, referred to as "dispersion") includes the aforementioned nanoparticles in a dispersion medium. The dispersion medium is not particularly limited as long as desired effect is not impaired. The dispersion medium may be an organic solvent, a water, or an aqueous solution of the organic solvent. The dispersion medium is preferably the organic solvent and the aqueous solution of the organic solvent, and more preferably the organic solvent.

Specific examples of the organic solvent which can be used as the dispersion medium include a methanol, an ethanol, a 1-propanpl, a 2-propanol, a 1-utanol, a 2-butanol, a 2-methyl-1-propanol, an acetone, an acetonitrile, a tetrahydrofuran, a toluene, an n-pentane, an n-hexane, an n-heptane, an ethyl acetate, a cyclohexanone, a methylamylketone, a butanediol monomethyl ether, a propylene glycol monomethyl ether, an ethylene glycol monomethyl ether, a butanediol monoethyl ether, a propylene glycol monoethyl ether, an ethylene glycol monoethyl ether, a propylene glycol dimethyl ether, a diethylene glycol dimethyl ether, a propylene glycol monomethyl ether acetate (PGMEA), a propylene glycol monoethyl ether acetate, an ethyl pyruvate, a butyl acetate, a methyl 3-methoxypropionate, an ethyl 3-ethoxypropionate, a tert-butyl acetate, a tert-butyl propionate, a propylene glycol mono-tert-butyl ether acetate, a γ-butyrolactone, an acetylacetone, a methyl acetoacetate, an ethyl acetoacetate, a propyl acetoacetate, a butyl acetoacetate, a methyl pivaloylacetate, a methyl isobutyloylacetate, a methyl caprolyacetate, a methyl lauroylacetate, a 1,2-ethanediol, a 1,2-propanediol, a 1,2-butanediol, a 1,2-pentanediol, a 2,3-butanediol, a 2,3-pentanediol, a glycerin, a diethylene glycol, a hexylene glycol, and the like, and a mixture of two or more of these.

A content of the nanoparticles in the dispersion is not particularly limited. The content of the nanoparticles in the dispersion is preferably 1% by mass or more and 80% by mass or less, and more preferably 5% by mass or more and 50% by mass or less.

The dispersion may include various additives, if necessary. For example, additives, surfactants, viscosity modifiers, and the like are exemplified as the additives. In addition, in order to give the dispersion film-forming property, various resins, various radically polymerizable compounds, and various cationically polymerizable compounds can be added to the dispersion. When the dispersion includes the polymerizable compound, the dispersion may include a curing agent or a polymerization initiator, depending on the type of the polymerizable compound.

As mentioned above, the aforementioned nanoparticles are hard to aggregate, and stably dispersed in the dispersion. Specifically, a 99.99% volume cumulated diameter of the nanoparticles measured by a dynamic light scattering method is preferably smaller than 5 times an average primary particle diameter of the nanoparticles measured by X-ray diffraction method.

EXAMPLES

Hereinafter, the present invention is described in more detail by way of Examples. The present invention is not limited to these Examples.

Example 1

Titanium oxide particles were prepared by the same method as in Example 8 of International Publication No. 2020/106860. A shape of the titanium oxide particles was spherical according to a TEM observation of the titanium oxide particles obtained. With respect to the titanium oxide particles obtained, XRD measurement was carried out with an X-ray diffractometer (SmartLab, manufactured by Rigaku Corp.). Obtained result was analyzed with accompanying software PDXL to determine an average primary particle diameter (size of crystallite) of the titanium oxide particles. The average primary particle diameter of the titanium oxide particles was 10 nm.

100 parts by mass of titanium oxide particles, 25 parts by mass of pentyltrimethoxysilane as the silane compound represented by the formula (1), and propylene glycol monomethyl ether acetate (PGMEA) as the dispersion medium were mixed in a vial bottle. Contents in the vial bottle were stirred at 110° C. for 30 minutes to react the silane compound with surfaces of the titanium oxide particles. Subsequently, 5 parts by mass of a penta-n-butoxy niobium as the niobium compound were added to the liquid in the vial bottle. Contents in the vial bottle were stirred at 110° C. for 20 minutes to react the niobium compound with surfaces of the titanium oxide particles. The titanium oxide particles where those surfaces were functionalized with the pentyltrimethoxysilane and the penta-n-butoxy niobium were collected by centrifuge after addition on an n-heptane to the obtained reaction liquid.

Example 2

Titanium oxide particles where those surfaces were functionalized with the pentyltrimethoxysilane and the penta-n-butoxy niobium were obtained in the same manner as in Example 1 except that the amount of the pentyltrimethoxysilane was changed from 25 parts by mass to 30 parts by mass and the amount of the penta-n-butoxy niobium was changed from 5 parts by mass to 20 parts by mass.

Comparative Example 1

Titanium oxide particles where those surfaces were functionalized with the pentyltrimethoxysilane were obtained in the same manner as in Example 1 except that the amount of the pentyltrimethoxysilane was changed from 25 parts by mass to 30 parts by mass and the penta-n-butoxy niobium was not used.

Average primary particle diameters of the titanium oxide particles where those surfaces were functionalized obtained in Example 1, Example 2 and Comparative Example 1 were measured by X-ray diffraction method. The average primary particle diameter of all titanium oxide particles was 10.6 nm.

X-ray photoelectron spectroscopy (XPS) analysis was also performed on the titanium oxide particles where those surfaces were functionalized obtained in Example 1, Example 2, and Comparative Example 1. The value of MN/MS which is a ratio of MN:the number of moles of niobium atoms derived from the niobium compound and MS:the number of moles of silicon atoms derived from the silane compound in the titanium oxide particles was calculated based on the XPS analysis. FT-IR spectra were obtained for the titanium dioxide particles where those surfaces were functionalized obtained in Example 1 and Example 2 using an infrared spectrophotometer (FT-IR Nicolet 6700, Thermo Fisher Scientific Inc.). The absorbance near the wavenumber 910 cm-1 in the obtained FT-IR spectra indicated that the titanium oxide particles where those surfaces were functionalized obtained in Example 1 and Example 2 have Si—O—Nb bonds on the surfaces.

Furthermore, dispersions where the titanium oxide particles obtained in Example 1, Example 2, or Comparative Example 1 were dispersed in dipropylene glycol monomethyl ether at a content of 5% by mass were prepared. 99.99% volume cumulated diameters (Dv9999) of the titanium oxide particles in the obtained dispersions were measured by dynamic light scattering method. A dynamic light scattering (DLS) instrument (Malvern Zetasizer Nano S) was used to measure particle diameter by dynamic light scattering method.

These measured values are listed in Table 1.

TABLE 1

| | Amount of niobium compound (Parts by mass) | Amount of silane compound (Parts by mass) | XRD Average Primary Particle diameter (nm) | MN/MS | DLS measurement Dv9999 (nm) |
|---|---|---|---|---|---|
| Ex. 1 | 5 | 25 | 10.6 | 0.07 | 42.9 |
| Ex. 2 | 20 | 30 | 10.6 | 0.09 | 42.8 |
| Comp. Ex. 1 | 0 | 30 | 10.6 | 0 | 74.7 |

According to Table 1, with respect to the titanium oxide particles of Example 1 and Example 2 where those surfaces were functionalized with the silane compound and the niobium compound respectively having specific structure, it can be seen that the 99.99% volume cumulated diameter (Dv9999) measured by a dynamic light scattering method is smaller than 5 times the average primary particle diameter measured by X-ray diffraction method. This indicates that aggregation of primary particles is suppressed. On the other hand, with respect to the titanium oxide particles of Comparative Example 1 where those surfaces were functionalized with the only silane compound, the 99.99% volume cumulated diameter (Dv9999) measured by a dynamic light scattering method is larger than 7 times the average primary particle diameter measured by X-ray diffraction method. This indicates advanced aggregation of primary particles.

In addition, dispersions where the titanium oxide particles obtained in Example 2 and Comparative Example 1 were dispersed in dipropylene glycol monomethyl ether at a content of 5% by mass were prepared. The absorbances (ABS) of the obtained dispersions were measured using a spectrophotometer (UV-3600, manufactured by Shimadzu Corp.). The measurement result is shown in FIG. 1/According to FIG. 1, it can be seen that absorbance of the dispersion including the titanium oxide particles of Comparative Example 1 is higher than absorbance of the dispersion including the titanium oxide particle of Example 2 at whole measurement wavelength range. In other words, transparency of the dispersion including the titanium oxide particles of Example 2 is higher than transparency of dispersion including the titanium oxide particles of Comparative Example 1.

Example 3

Titanium oxide particles were obtained in the same manner as in Example 1 except that n-butanol was changed to benzyl alcohol. A shape of the titanium oxide particles was spherical according to a TEM observation of the titanium oxide particles obtained. Average primary particle diameter of the titanium oxide particles measured by X-ray diffraction method was 9.7 nm.

100 parts by mass of obtained titanium oxide particles were reacted with 25 parts by mass of pentyltrimethoxysilane and 5 parts by mass of penta-n-butoxy niobium in the same manner as in Examplel to obtain the titanium oxide particles where those surfaces were functionalized with the pentyltrimethoxysilane and the penta-n-butoxy niobium.

Example 4

The titanium oxide particles where those surfaces were functionalized with the pentyltrimethoxysilane and the penta-n-butoxy niobium were obtained in the same manner as in Example 3 except that the amount of the pentyltrimethoxysilane was changed from 25 parts by mass to 15 parts by mass and the amount of the penta-n-butoxy niobium was changed from 5 parts by mass to 15 parts by mass.

Example 5

The titanium oxide particles where those surfaces were functionalized with the pentyltrimethoxysilane and the penta-n-butoxy niobium were obtained in the same manner as in Example 3 except that the amount of the pentyltrimethoxysilane was changed from 25 parts by mass to 35 parts by mass and the amount of the penta-n-butoxy niobium was changed from 5 parts by mass to 20 parts by mass.

Example 6

The titanium oxide particles where those surfaces were functionalized with the pentyltrimethoxysilane and the penta-n-butoxy niobium were obtained in the same manner as in Example 3 except that the amount of the pentyltrimethoxysilane was changed from 25 parts by mass to 35 parts by mass and the amount of the penta-n-butoxy niobium was changed from 5 parts by mass to 40 parts by mass.

Comparative Example 2

The titanium oxide particles where those surfaces were functionalized with the pentyltrimethoxysilane were obtained in the same manner as in Example 3 except that the amount of the pentyltrimethoxysilane was changed from 25 parts by mass to 35 parts by mass and the penta-n-butoxy niobium was not used.

Average primary particle diameters of the titanium oxide particles where those surfaces were functionalized obtained in Examples 3 to 6 and Comparative Example 2 were measured by X-ray diffraction method. As a results, the average primary particle diameters of all titanium oxide particles were 9.7 nm.

In addition, X-ray photoelectron spectroscopy (XPS) analysis was performed on the titanium oxide particles where those surfaces were functionalized obtained in Examples 3 to 6, and Comparative Example 2. The value of MN/MS which is a ratio of MN:the number of moles of niobium atoms derived from the niobium compound and MS:the number of moles of silicon atoms derived from the silane compound, in the titanium oxide particles, was determined by XPS analysis. FT-IR spectra were obtained for the titanium dioxide particles where those surfaces were functionalized obtained in Examples 3 to 6 using an infrared spectrophotometer (FT-IR Nicolet 6700, Thermo Fisher Scientific Inc.). It was found that the titanium oxide particles where those surfaces were functionalized obtained in Examples 3 to 6 have Si—O—Nb bonds on their surfaces from the absorbances around the wavenumber 910 cm-1 in the FT-IR spectra obtained.

Furthermore, dispersions where the titanium oxide particles obtained in Examples 3 to 6 and Comparative Example 2 were dispersed in dipropylene glycol monomethyl ether at a content of 5% by mass were prepared. 99.99% volume cumulated diameters (Dv9999) of the titanium oxide particles in the obtained dispersions were measured by dynamic light scattering method. A dynamic light scattering (DLS) instrument (Malvern Zetasizer Nano S) was used to measure particle diameter by dynamic light scattering method.

These measured values are listed in Table 1.

TABLE 2

| | Amount of niobium compound (Parts by mass) | Amount of silane compound (Parts by mass) | XRD Average Primary Particle diameter (nm) | MN/MS | DLS measurement Dv9999 (nm) |
|---|---|---|---|---|---|
| Ex. 3 | 5 | 25 | 9.7 | 0.09 | 32.1 |
| Ex. 4 | 15 | 15 | 9.7 | 0.15 | 43.3 |
| Ex. 5 | 20 | 35 | 9.7 | 0.10 | 31.9 |
| Ex. 6 | 40 | 35 | 9.7 | 0.15 | 42.6 |
| Comp. Ex. 2 | 0 | 35 | 9.7 | 0 | 55.8 |

According to Table 2, with respect to the titanium oxide particles of Examples 3 to 6 where those surfaces were functionalized with the silane compound and the niobium compound respectively having specific structure, it can be seen that the 99.99% volume cumulated diameter (Dv9999) measured by a dynamic light scattering method is smaller than 5 times the average primary particle diameter measured by X-ray diffraction method. This indicates that aggregation of primary particles is suppressed. On the other hand, with respect to the titanium oxide particles of Comparative Example 2 where those surfaces were functionalized with the only silane compound, the 99.99% volume cumulated diameter (Dv9999) measured by a dynamic light scattering method is larger than times the average primary particle diameter measured by X-ray diffraction method. This indicates advanced aggregation of primary particles.

What is claimed is:

1. Nanoparticles comprising inorganic oxide particles, wherein surfaces of the inorganic oxide particles are functionalized with a functionalizing agent comprising at least one selected from a niobium compound represented by formula (1):

$$(R^{10}O)_{5-n}Nb(R^{11})_n \quad (1)$$

wherein, in the formula (1), n is an integer of 1 or more and 4 or less, $R^{10}$ is an alkyl group, and $R^{11}$ is a monovalent organic group bonding to niobium atom via Nb—C bond, and at least one selected from a silane compound represented by formula (2):

$$(R^{20}O)_{4-x}Si(R^{21}-R^{22})_x \quad (2)$$

wherein, in the formula (2), x is an integer of 1 or more and 3 or less, $R^{20}$ is an alkyl group, $R^{21}$ is a spacer group bonding to silicon atom via Si—C bond, and $R^{22}$ is a hydrogen atom or a monovalent organic group.

2. The nanoparticles according to claim 1, wherein the inorganic oxide particles are titanium oxide particles or zirconium oxide particles.

3. The nanoparticles according to claim 1, wherein an average primary particle size of the nanoparticles measured by X-ray diffraction method is 3 nm or more and 20 nm or less.

4. The nanoparticles according to claim 1, wherein MN/MS which is a ratio of MN:a number of moles of niobium atoms derived from the niobium compound represented by the formula (1) and MS:a number of moles of silicon atoms derived from the silane compound represented by the formula (2) is 0.01 or more and 2.0 or less.

5. A dispersion of nanoparticles comprising the nanoparticles according to claim 1 in a dispersion medium.

6. A method for producing nanoparticles comprising inorganic oxide particles, wherein surfaces of the inorganic oxide particles are functionalized, the method comprising:

reacting surfaces of inorganic oxide particles with a functionalizing agent comprising at least one selected from a niobium compound represented by formula (1)

$$(R^{10}O)_{5-n}Nb(R^{11})_n \quad (1)$$

wherein, in the formula (1), n is an integer of 1 or more and 4 or less, $R^{10}$ is an alkyl group, and $R^{11}$ is a monovalent organic group bonding to niobium atom via Nb—C bond, and at least one selected from a silane compound represented by formula (2):

$$(R^{20}O)_{4-x}Si(R^{21}-R^{22})_x \quad (2)$$

wherein, in the formula (2), x is an integer of 1 or more and 3 or less, $R^{20}$ is an alkyl group, $R^{21}$ is a spacer group bonding to a silicon atom via Si—C bond, and $R^{22}$ is a hydrogen atom or a monovalent organic group.

* * * * *